United States Patent
Fukuda

(10) Patent No.: US 8,589,763 B2
(45) Date of Patent: Nov. 19, 2013

(54) CACHE MEMORY SYSTEM

(75) Inventor: Takatoshi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 13/223,996

(22) Filed: Sep. 1, 2011

(65) Prior Publication Data
US 2012/0117428 A1     May 10, 2012

(30) Foreign Application Priority Data
Nov. 9, 2010   (JP) .................................. 2010-250495

(51) Int. Cl.
*G11C 29/00*     (2006.01)

(52) U.S. Cl.
USPC ............................. 714/763; 714/768; 714/805

(58) Field of Classification Search
USPC .......... 714/763, 768, 703, 805, 113, 103, 48, 714/30
See application file for complete search history.

(56) References Cited

U.S. PATENT DOCUMENTS

| | | | | |
|---|---|---|---|---|
| 5,649,090 A | * | 7/1997 | Edwards et al. | 714/10 |
| 5,958,072 A | * | 9/1999 | Jacobs et al. | 714/30 |
| 5,961,655 A | * | 10/1999 | Johnson et al. | 714/48 |
| 6,163,857 A | * | 12/2000 | Meaney et al. | 714/6.32 |
| 7,673,216 B2 | | 3/2010 | Hino et al. | |

FOREIGN PATENT DOCUMENTS

| | | |
|---|---|---|
| JP | 58-1899 | 1/1983 |
| JP | 63-278162 | 11/1988 |
| JP | 2-143352 | 6/1990 |
| JP | 2007-41932 | 2/2007 |

OTHER PUBLICATIONS

Korean Office Action mailed Apr. 10, 2013 for corresponding Korean Application No. 10-2011-0085922.

* cited by examiner

*Primary Examiner* — Fritz Alphonse
(74) *Attorney, Agent, or Firm* — Staas & Halsey LLP

(57) ABSTRACT

A cache memory is operated in a write through system, and an operation to be performed when a cache mishit occurs is performed when corresponding data is not stored in the cache memory, or only when an error occurs although there is the data. Then, a bit indicating that a soft error has occurred before is set in the cache memory, and when the bit indicates "1" and if an error has occurred again, it is determined that a hardware error has occurred, and an interrupt is generated in the CPU. The bit is to be reset at time intervals sufficiently shorter than the frequency at which it is considered that a soft error occurs.

11 Claims, 16 Drawing Sheets

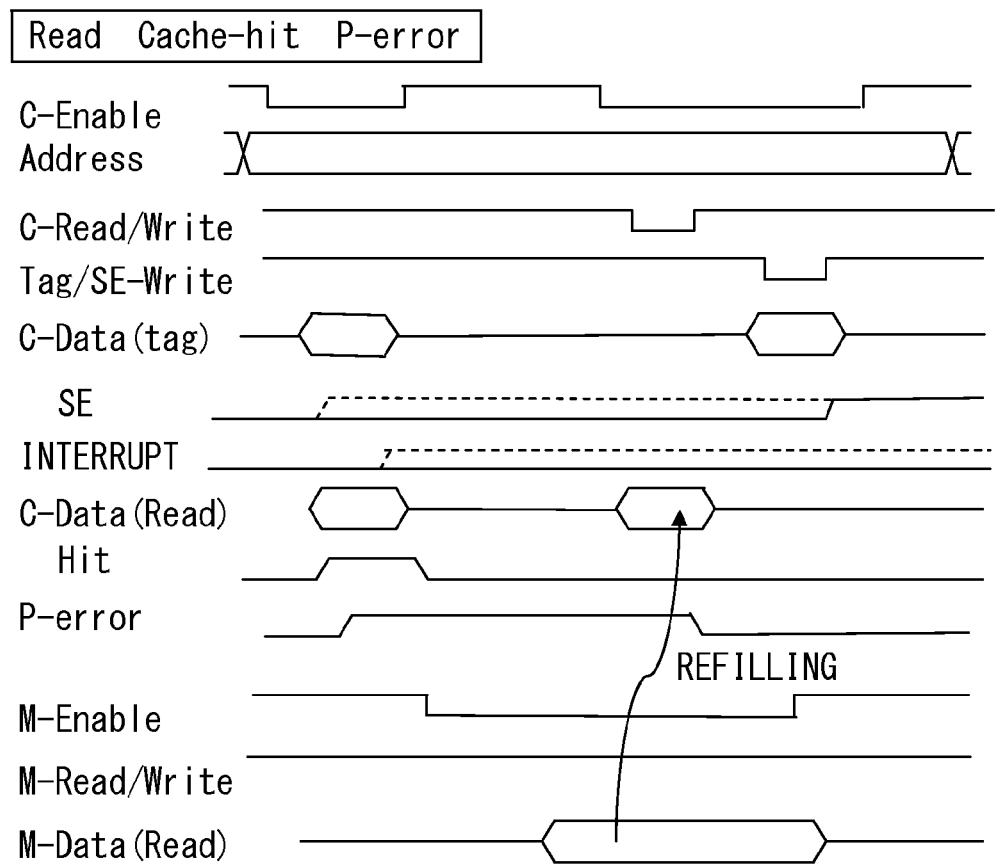
F I G. 3 B

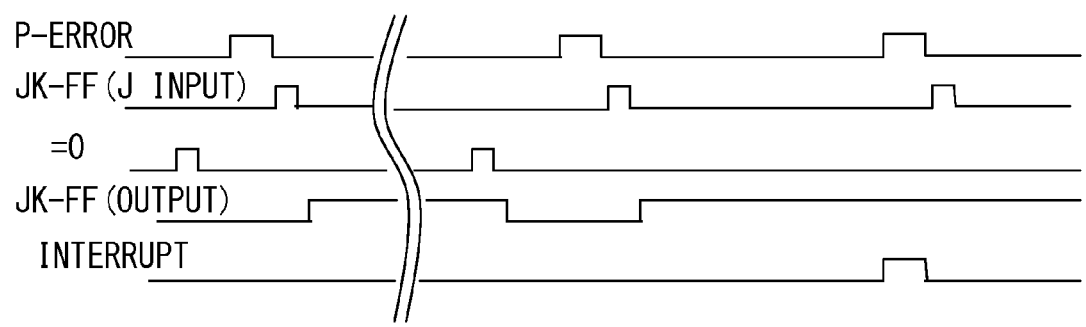
F I G. 4B

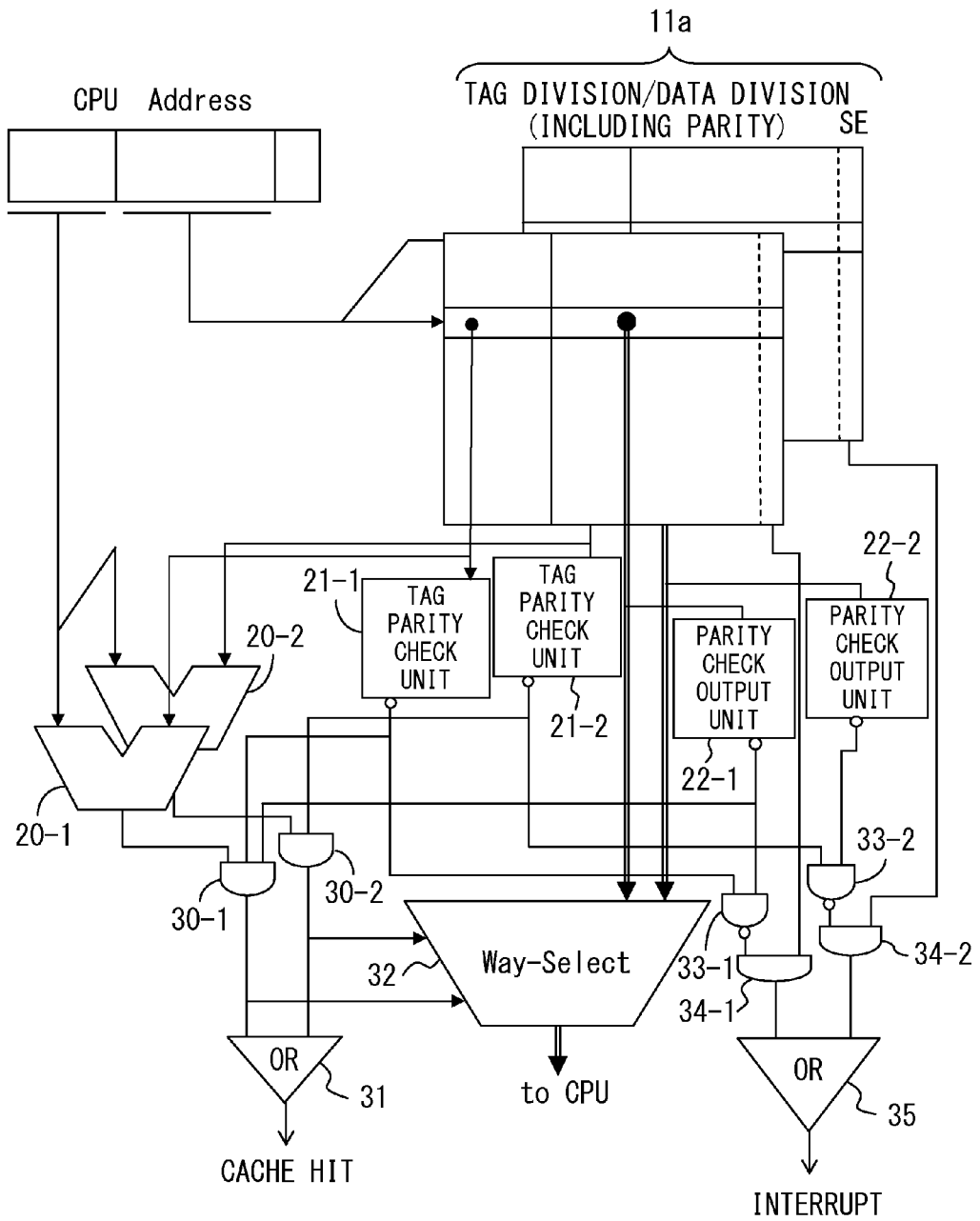
F I G. 5

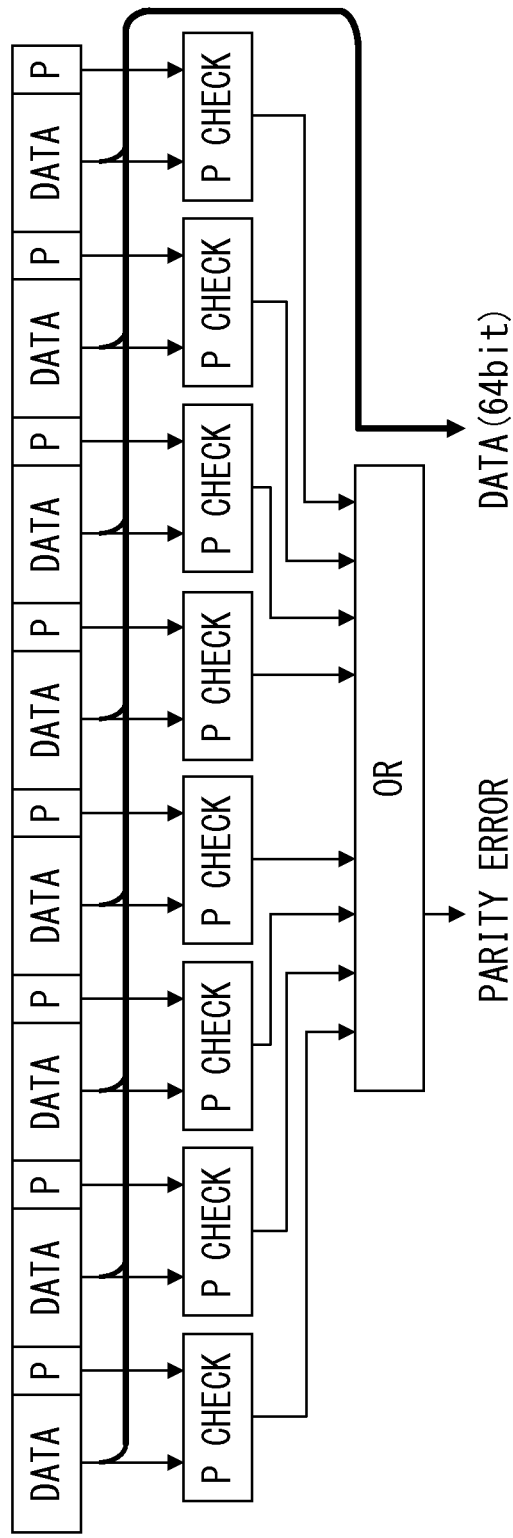
F I G. 6

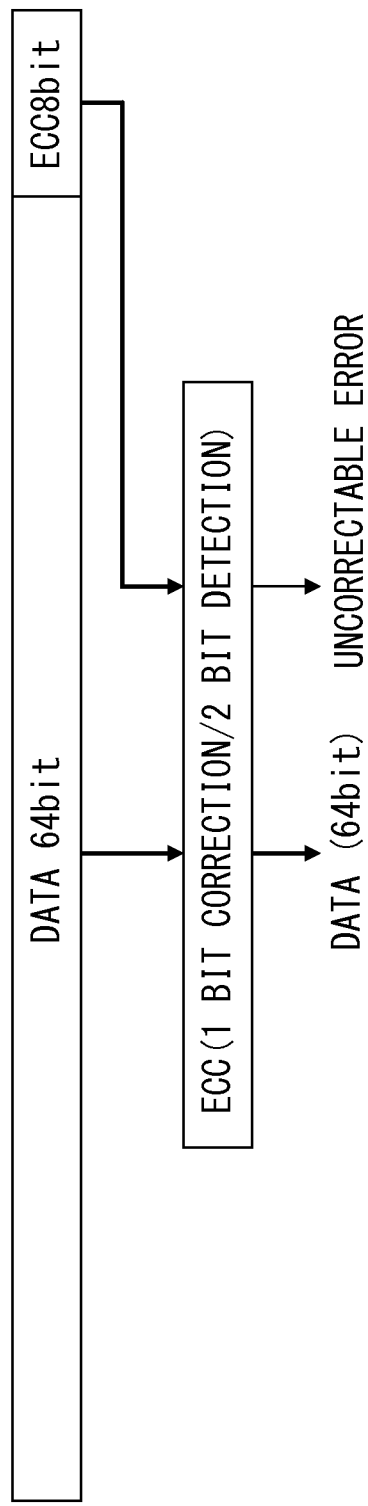
F I G. 7

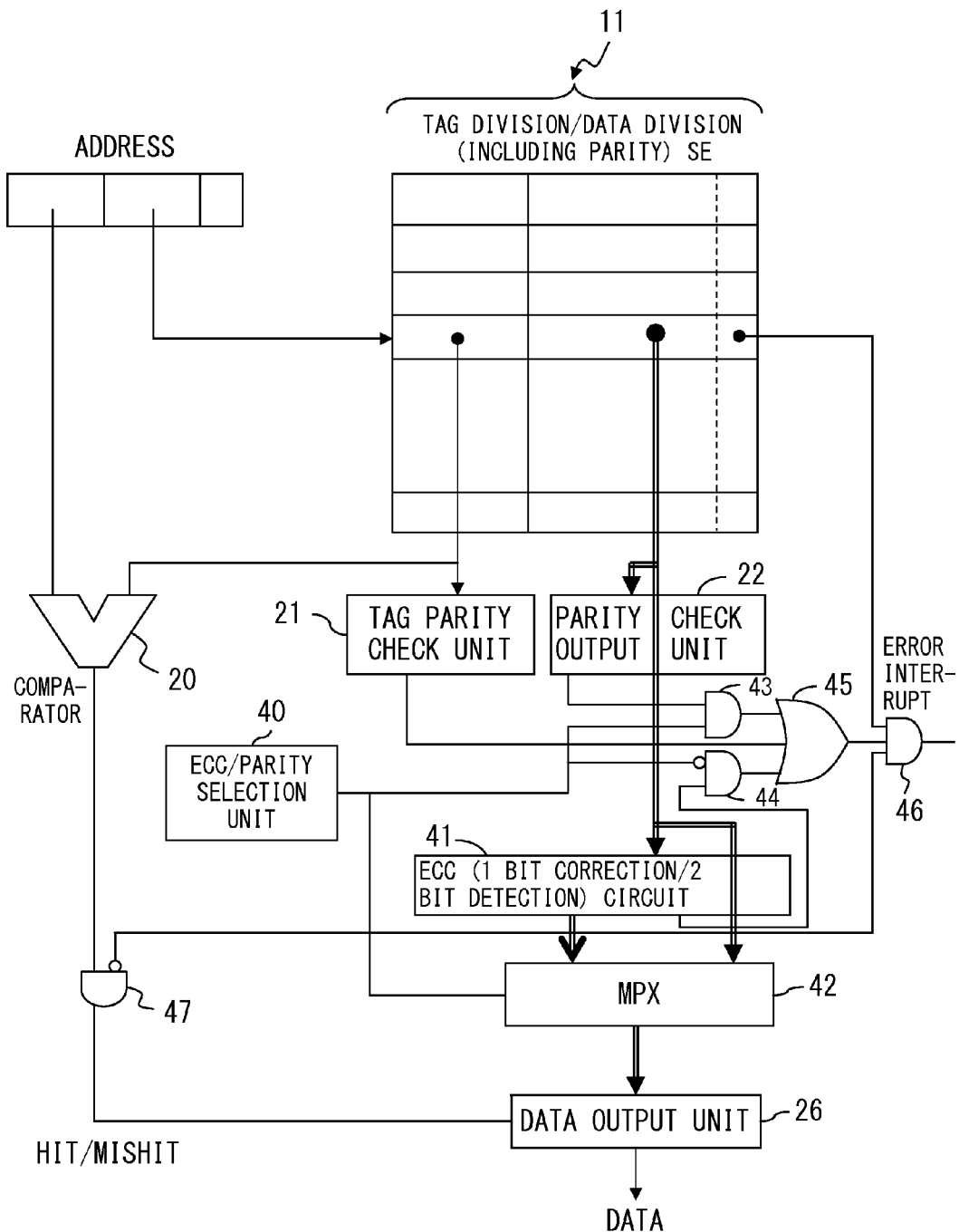
F I G. 8A

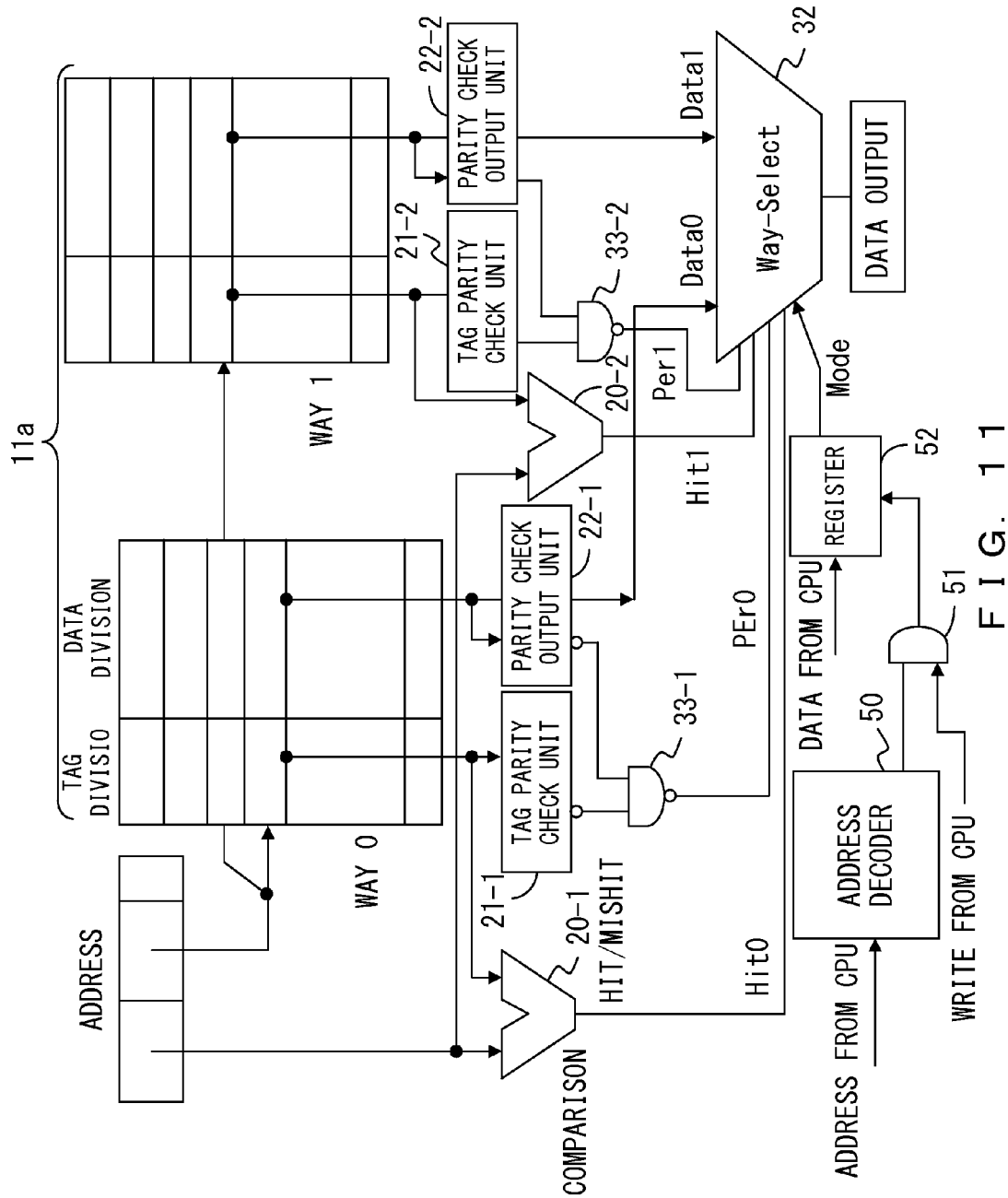
F I G. 11

MODE 0: NORMAL MODE, MODE 1: MODE ACCORDING TO PRESENT EMBODIMENT

| OPERATION | Mode | Hit0 | Hit1 | PEr0 | PEr1 | DATA OUTPUT |
|---|---|---|---|---|---|---|
| 1 | X | 0 | 0 | X | X | - (miss hit) |
| 2 | 0 | 1 | 0 | 0 | X | Data0 |
| 3 | 0 | 1 | 0 | 1 | X | -(Parity Err) |
| 4 | 0 | 0 | 1 | X | 0 | Data1 |
| 5 | 0 | 0 | 1 | X | 1 | -(Parity Err) |
| 6 | 0 | 1 | 1 | X | X | -(Error) |
| 7 | 1 | 1 | X | 0 | X | Data0 |
| 8 | 1 | 1 | 1 | 1 | 0 | Data1 |
| 9 | 1 | 0 | 1 | X | 0 | Data1 |
| 10 | 1 | 1 | 1 | 1 | 1 | -(Parity Err) |

F I G. 1 2

MODE 0: NORMAL MODE, MODE 1: MODE ACCORDING TO PRESENT EMBODIMENT

| OPERATION | Mode | Way0-tag | | Way1-tag | | LRU | Way0 | Way1 |
|---|---|---|---|---|---|---|---|---|
| | | Hit/Miss-hit | Valid/Invalid | Hit/Miss-hit | Valid/Invalid | | | |
| 1 | 0 | 1 | x | 0 | x | x | Write | - |
| 2 | 0 | 0 | x | 1 | x | x | - | Write |
| 3 | 0 | 0 | I | 0 | V | x | Write | - |
| 4 | 0 | 0 | V | 0 | I | x | - | Write |
| 5 | 0 | 0 | V | 0 | V | 0 | Write | - |
| 6 | 0 | 0 | I | 0 | V | 1 | - | Write |
| 7 | 1 | 1 | x | x | I | x | Write | - |
| 8 | 1 | 0 | x | 1 | V | x | Write | Write |
| 9 | 1 | 0 | V | 0 | V | x | Write | Write |
| 10 | 1 | 0 | I | 0 | I | x | Write | Write |

F I G. 1 3

CACHE MEMORY SYSTEM

CROSS-REFERENCE TO RELATED APPLICATIONS

This application is based upon and claims the benefit of priority of the prior Japanese Patent Application No. 2010-250495, filed on Nov. 9, 2010 the entire contents of which are incorporated herein by reference.

FIELD

The following embodiments relate to a cache memory system capable of suppressing the influence of a soft error.

BACKGROUND

With the recent advanced semiconductor technique, there are increasing tendencies to have fine structures of wiring etc. for semiconductor devices. However, when the finer the circuit of the wiring etc. of a semiconductor device, the higher possibility that an α ray and a cosmic ray (neutron beam) which are externally received incur an operation error of the circuit. As for memory, a small memory unit of a large capacity has been produced. However, since the structure of the circuit is fine, there is the possibility that the α ray and the cosmic ray (neutron beam) cause an error in the stored data. The error is called a soft error. The soft error can be caused in both main memory and cache memory.

The write system for the cache memory can be a write back system and a write through system. It is known that although the operation speed performance of the write back system is higher but the control of the write back system is more complicated. However, as for a soft error, the write through system is recommendable in view of a soft error because in the write back system the data contents stored in the cache memory are often written back to the main memory after a lapse of a long time, and the data as the memory contents can be inverted, thereby causing a conspicuous soft error when the data is written back. On the other hand, in the write through system, data is written to the cache and simultaneously to the main memory, thereby reducing the operation of reading the contents after a lapse of a long time, and allowing the soft error rate to be apparently lower.

Therefore, it is effective that the write through system is adopted as a cache memory system at the cost of the operation speed performance of the cache memory.

When the write through system is used for cache memory, it is said that the same data contents can be maintained between the cache memory and the main memory. based on this, when an error occurs in the cache memory, the data in the cache memory is discarded, the data contents in the main memory corresponding to the address in the cache where the error has occurred can be read and transmitted to the CPU, and the data contents in the cache memory where the error has occurred can be rewritten, thereby resuming a normal operation.

The conventional technology includes correcting an error as a temporary error in buffer memory, preventing an error exceeding the number of correctable bits by a combination of a soft error by an α ray and an error from a hardware fault, and suppressing the accumulation of soft errors.

DOCUMENTS OF PRIOR ART

Patent Document

[Patent Document 1] Japanese Laid-open Patent Publication No. 58-1899

[Patent Document 2] Japanese Laid-open Patent Publication No. 2-143352

[Patent Document 3] Japanese Laid-open Patent Publication No. 63-278162

SUMMARY

The cache memory system as an aspect of the following embodiments includes: cache memory for storing data containing a tag division and a data division; an error detection unit for detecting an error in the tag division and the data division; and a control unit for operating the cache memory in a write through system and defining as a cache hit information to be transmitted to a CPU a signal of a result of a logical product of a signal indicating that there is a cache hit in cache hit information in the tag division and a signal indicating that there is no error detected in an error detecting process by the error detection unit, reads data of an address corresponding to data in the cache memory in which an error has occurred from the main memory when the error has occurred as in a case in which there is a cache mishit, and replaces the data in the cache memory which has caused the error with the read data.

The following embodiments provide a cache memory system capable of more correctly suppressing the influence of a soft error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3B illustrates the operation of the cache memory system according to the present embodiment;

FIG. 4B illustrates the operation of the cache memory system according to the present embodiment;

FIG. 5 is a configuration of a 2-way set associative system;

FIG. 6 illustrates a circuit for performing a parity check;

FIG. 7 is a circuit chart of an ECC circuit as an error detection circuit;

FIG. 8A is a configuration with an ECC circuit illustrated in FIG. 7 as applied to FIG. 3A;

FIG. 11 is a detailed explanatory view (1) of the operation according to an embodiment of the present invention;

FIG. 12 is a detailed explanatory view (2) of the operation according to an embodiment of the present invention; and FIG. 13 is a detailed explanatory view (3) of the operation according to an embodiment of the present invention.

DESCRIPTION OF EMBODIMENTS

In the present embodiment, cache memory is operated in the write through system, and the operation performed when a cache mishit occurs is performed when there is no corresponding data in the cache memory or when an error occurs although there is the data. Then, a bit indicating that a soft error has occurred before is provided in the cache memory. If an error occurs again when the bit indicates "1", it is determined that a hardware error has occurred, and an interrupt is generated in the CPU. The determination as to whether or not a hardware error has occurred is made by providing a register to be set when an error occurs in the cache memory, and to be reset at time intervals sufficiently shorter than the frequency at which a soft error occurs. If an error occurs in the cache memory when the register is set, then it is determined that a hardware error has occurred, and an interrupt is generated in the CPU.

As described above, when there is an error in the data in the cache memory, as in the case of a cache mishit, data is read from the main memory, and new data is rewritten to the cache memory, thereby suppressing the propagation of the influence of the error.

Figure 1:
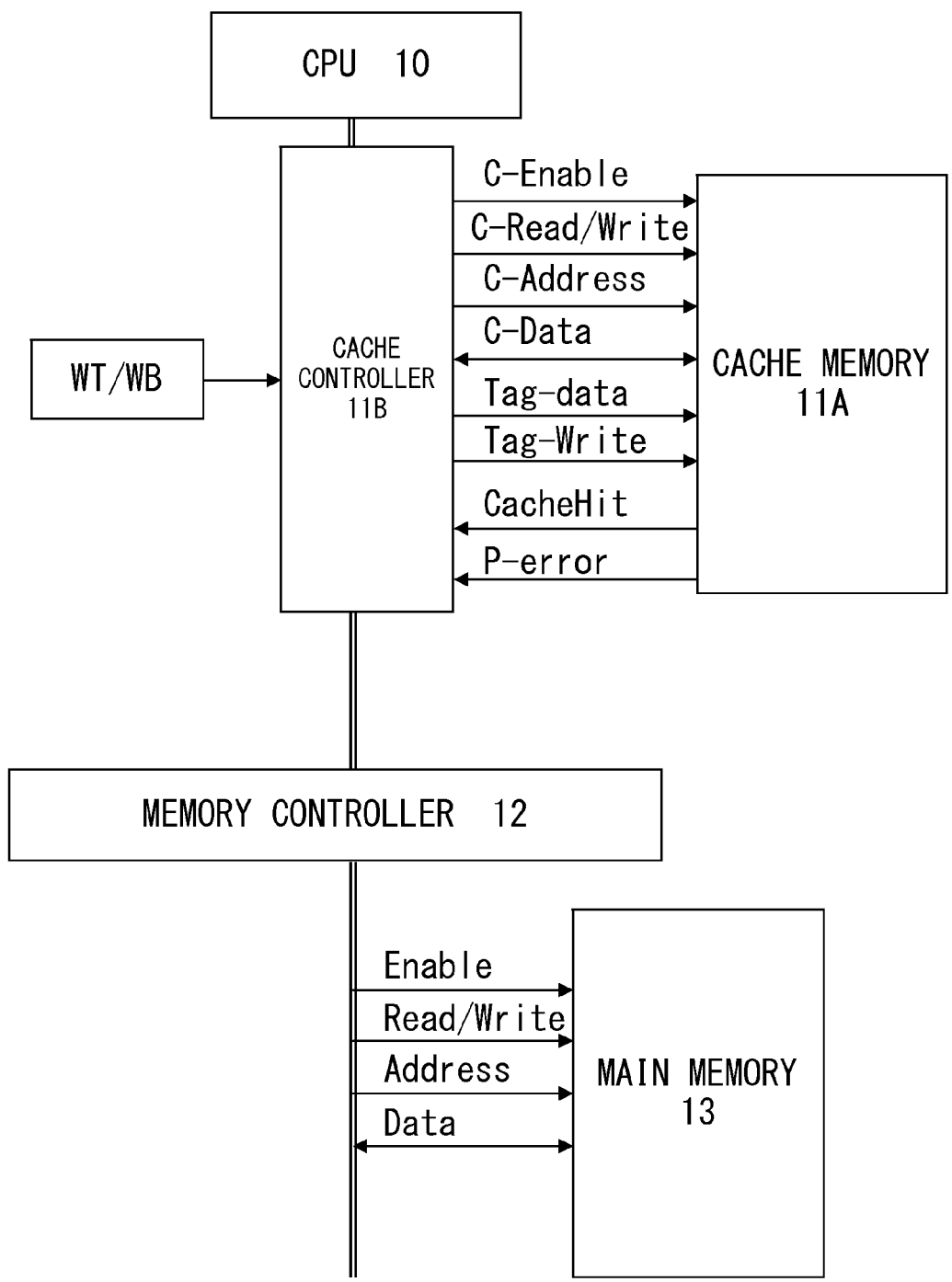
FIG. 1 is a view (1) for explanation of the operation of cache memory.

FIGS. 1 and 2 are explanatory views of the operation of the cache memory;

Normally, the cache memory is divided into line units (of about 16~64 bytes), and a tag is assigned to each line. The contents of the tag include address information and a status indicating to where in the main memory the line corresponds. There are two statuses in the write through system, that is, "valid" and "invalid". The "invalid" indicates resetting, and the "valid" indicates correct data in the cache. On the other hand, in the write back system, there are three statuses, that is, "invalid", "clean" (the contents of the cache are identical to the contents of the main memory), and "dirty" (the contents of the cache is correct, and the contents of the main memory is obsolete and inapplicable).

When a data write from the CPU occurs, and if there is a hit of the write address in the cache, the write data is written to the main memory and simultaneously to data division of the cache memory in the write through system. In the case of a cache mishit, the cache memory is ignored, and the data is written only to the main memory.

In the write back system, when a write occurs and if there is a cache hit, data is written only to the cache. It is obvious that the data consistency cannot be maintained between the main memory and the cache memory. This status is stored in the tag as a "dirty status". In the case of a mishit, a refilling operation (reading data of 1 line from the main memory) is performed, and then the read data is written to the cache memory (also in this case, the dirty status is entered).

FIG. 1 is a configuration of a block diagram of writing and reading data from the CPU.

An enable signal, a read/write signal, and an address signal indicating the address for read/write are input from a CPU 10 to a cache controller 11B and cache memory 11A. The cache memory 11A confirms whether or not there is data stored therein corresponding to the address indicated by the c-address signal. If there is the data, a cache-hit signal is set to "1". If not, the cache-hit signal is set to "0" for output to the cache controller 11B. If there is a cache hit, the cache memory 11A writes or reads data at the specified address at the read/write signal. The cache controller 11B requires a refilling operation in the case of a mishit in the write back system. However, in this case, the cache controller 11B issues to a memory controller 12 an instruction to read data of 1 line in the cache from the main memory. The memory controller 12 is a circuit for controlling the access to main memory 13.

The enable signal, the read/write signal, and the address signal from the CPU 10 are input to the main memory 13 through the memory controller 12. If there is a mishit in the cache memory 11A during a data read, the cache controller 11B issues to the memory controller 12 a read instruction to read data at the specified address. The read data is stored in the cache memory 11A.

When data is written in the write through system, and if there is a mishit, the data is written only to the main memory 13, not to the cache memory 11A. If there is a hit, the data is written to both cache memory 11A and main memory 13.

Figure 2A:
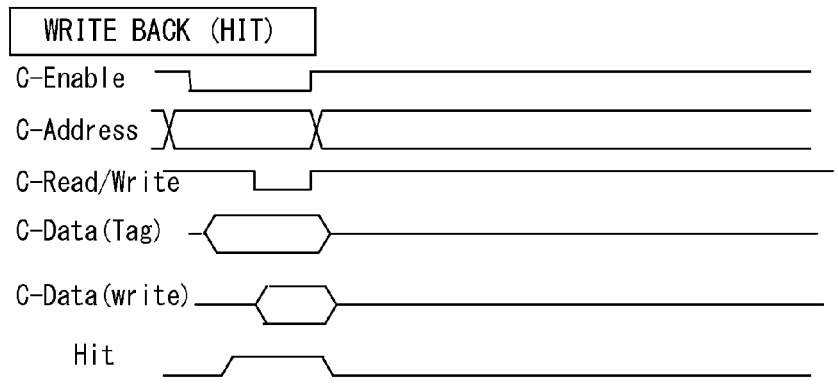
FIGS. 2A, B, and C are views (2) for explanation of the operation of cache memory.
Figure 2B:
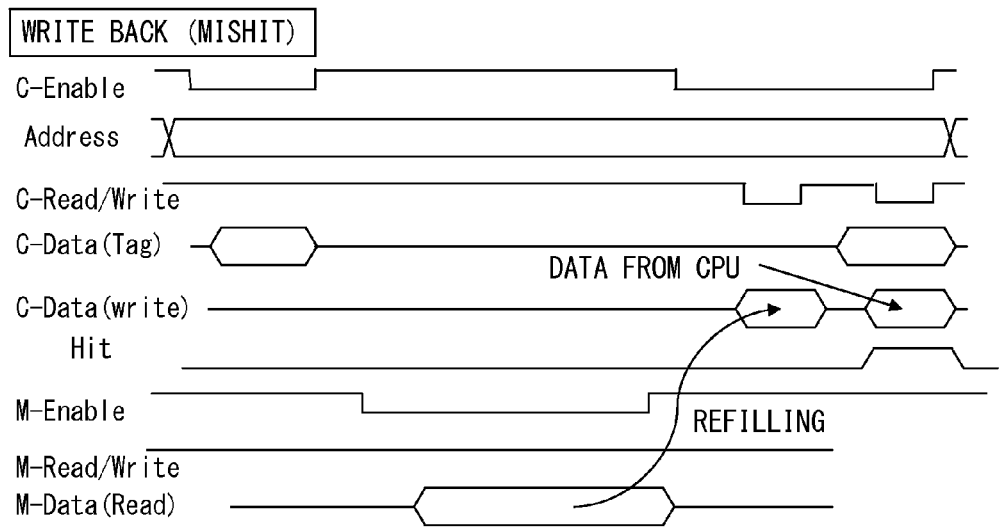
Figure 2C:
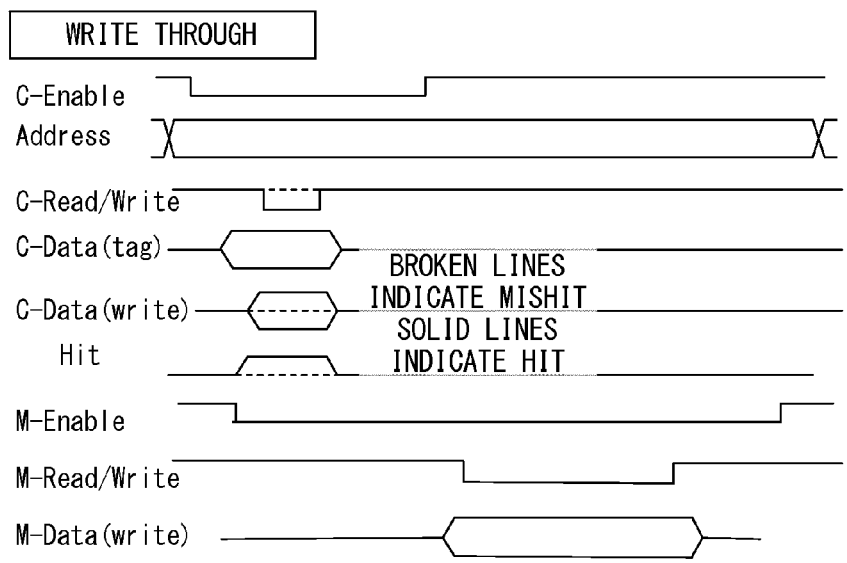

FIGS. 2A, 2B, and 2C illustrate signals for explanation of the operations in the write back system and the write through system.

The character "C" preceding each signal indicates a signal to the cache memory, and the character "M" preceding each signal indicates a signal to the main memory.

FIG. 2A illustrates a signal of a writing operation when there is a hit in the cache memory in the write back system. When the address signal is applied to the communication control information and simultaneously the c-enable signal is input, a tag in the cache is read. If the data of the tag matches the higher order portion of the address, the hit signal indicating that there is a hit in the cache memory is set to "1". When there is a hit in the cache, c-data (write) from the CPU is written to one work in the cache at the corresponding address with the write signal c-read/write set low. In addition, although not illustrated in FIG. 2, the status of the tag of the cache controller 11B is "dirty".

FIG. 2B is a view of a signal indicating the operation performed when there is a mishit in the cache memory in the write back system.

Although the c-enable signal is enabled, there is a mishit in the cache memory, and therefore, the hit signal remains "0". If there is a mishit, the cache controller issues to the memory controller an instruction to read data of one line from the main memory using the address indicated by the address signal (not illustrated in FIG. 2). In this case, if data has already been stored in the corresponding cache line, and the status of the tag is dirty, then the data is to be written back to the corresponding main memory. However, since this has nothing to do with the present invention, it is not illustrated in FIG. 2. The data read from the main memory is written to the corresponding cache memory. A write instruction is issued to the cache using the same address again, and the cache memory stores the data from the CPU.

FIG. 2C illustrates a signal for explanation of the operation in the write through system. First, the c-enable signal is enabled. The c-read/write signal specifies a write, and an address signal is output. The tag division is read at the address specified by the address signal, and if there is a hit, data is written to the cache memory, and then the same data is written to the main memory. If there is a mishit in the cache memory, no operation is performed in the cache memory, but data is written only to the main memory. If there is data in the cache memory, the contents of the corresponding data refer to the same contents between the cache memory and the main memory.

Figure 3A:
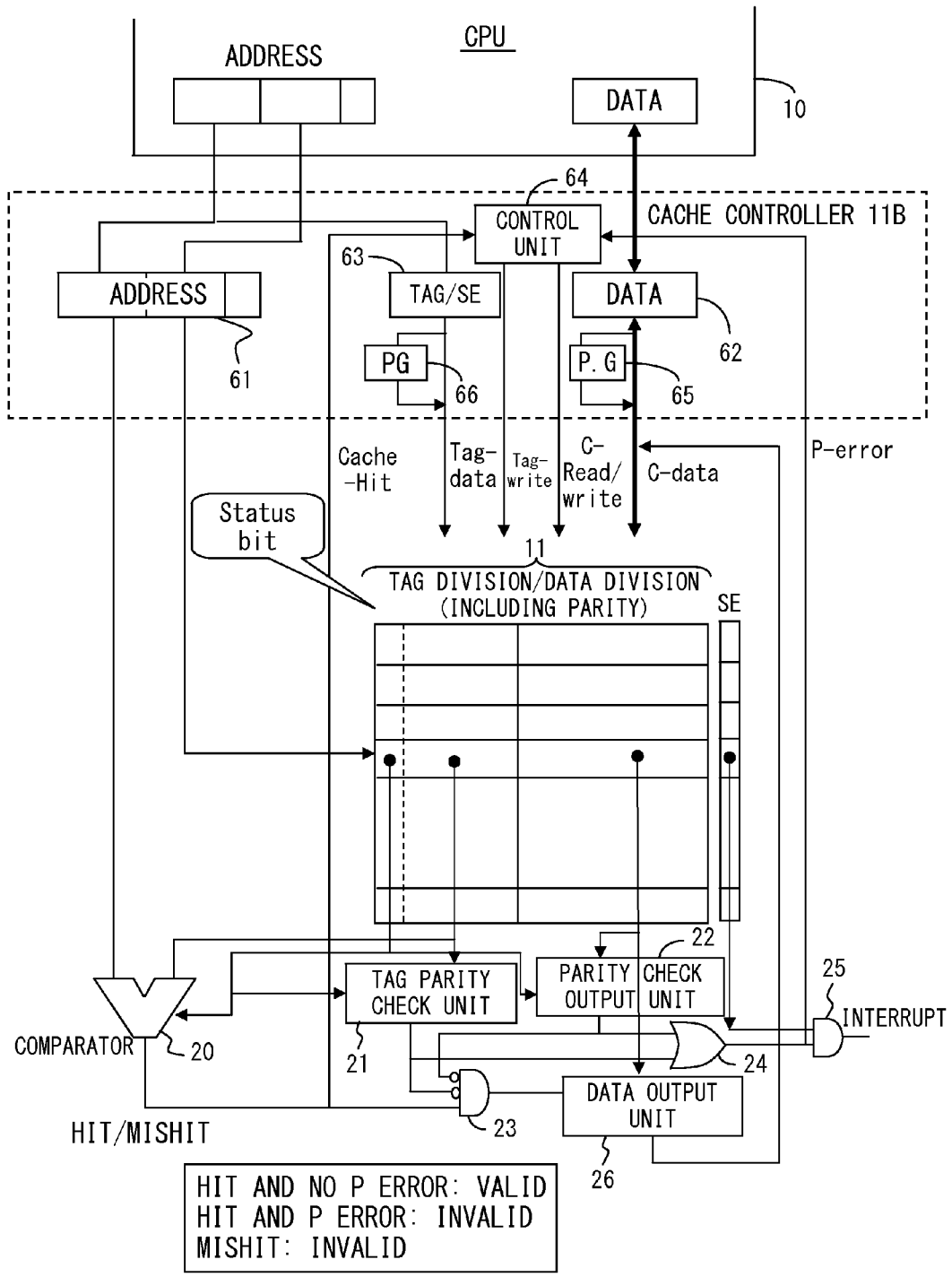
FIG. 3A is a view of the cache memory system according to the present embodiment.

FIG. 3A illustrates the cache memory system according to the present embodiment.

In the present embodiment, as illustrated in FIG. 3 A, the address from the CPU is fetched in the cache controller, and the tag division is read from the cache memory 11 using a part of the address. If the status of the tag is invalid, the comparator and both parity check circuits are disabled, and the output is "0". If the status is valid, the contents and the higher order address from the CPU are compared with each other. If they match, it refers to a hit. A parity check is performed on the contents read from the data division and the tag division. If there is no error, it is determined that the contents are valid, and transmitted to the CPU. If the data in the tag divisions do not match, or if a parity error occurs (refer to FIG. 3B), the data is invalid. That is, if there occurs a parity error, data is read from the main memory as in the case of a normal mishit, the data is transmitted to the CPU and the read data is also written to the data division of the cache, and the contents of the tag division are rewritten into a new address. If the tag is rewritten due to a parity error, "1" is written in the SE bit (described later) in the same line. When data is written from the CPU to the memory including the cache, it is determined that a mishit has occurred if a parity error occurs in the cache although the status of the tag is valid and the contents of the tag division match the corresponding address. Thus, the data from the CPU is written only to the main memory, and the status of the tag is changed into invalid. If there is no parity error, a parity bit is generated by a parity generation circuit PG (65) for the data from the CPU, and the data from the CPU is written to the data division of the cache with the parity bit. Since the write through system is used in this case, the data is also written to the main memory.

If a cache mishit or a parity error occurs when the CPU reads data from memory (FIG. 3B), data is read from the main memory at the corresponding address, and a parity generation circuit PG (65) generates a parity bit for the contents, and writes it with the contents read from the main memory to the data division of the cache. A parity generation circuit PG (66) generates a parity bit for a part of the corresponding address for the tag division, thereby writing it to the tag division of the cache.

A hit signal as an output of the comparator 20 and a signal obtained by logically inverting the signal as a parity check result of the tag parity check unit 21 and the parity check output unit 22 are input to a logical product circuit 23. Thus, the output of the logical product circuit 23 is "1" (valid) if there is a cache hit, and there is no error detected in the two parity checks. It is "0" (invalid) if there is a cache hit and a parity error. Although there is a cache mishit, it is "0" (invalid). A data output unit 26 outputs data from the data division of the cache memory 11 only when the output of the logical product circuit 23 is valid. The signal as a parity check result of the tag parity check unit 21 and the signal as a parity check result of the parity check output unit 22 are input to a logical sum circuit 24. The output of the logical sum circuit 24 is input to a logical product circuit 25. The value of the SE bit (described later) is also input to the logical product circuit 25. Thus, if there occurs an error in at least one of the two parity check results and the SE bit (described later) is "1", an interrupt signal for generating an interrupt in the CPU is generated. Thus, the quality of the cache can be improved by adding a very simple circuit (adding as a cache mishit a circuit for outputting the time where an error occurs) without adding software. That is, an error can be removed by reading data of a corresponding address from the main memory when a parity error occurs as when a cache mishit occurs, overwriting data in the cache, and updating the contents of a tag. Furthermore, to provide a determination circuit for determining whether a parity error is a hardware error or a soft error, for example, one bit (SE bit as a soft error bit) is added in the entry of the cache memory 11. When a parity error occurs, the bit is set to "1". If a parity error occurs when data is read at the same address, and the SE bit is "1", then it is determined that the error is a hardware error (based on that it is rare that soft errors occur at the same address because soft errors occur at random points).

Figure 4A:
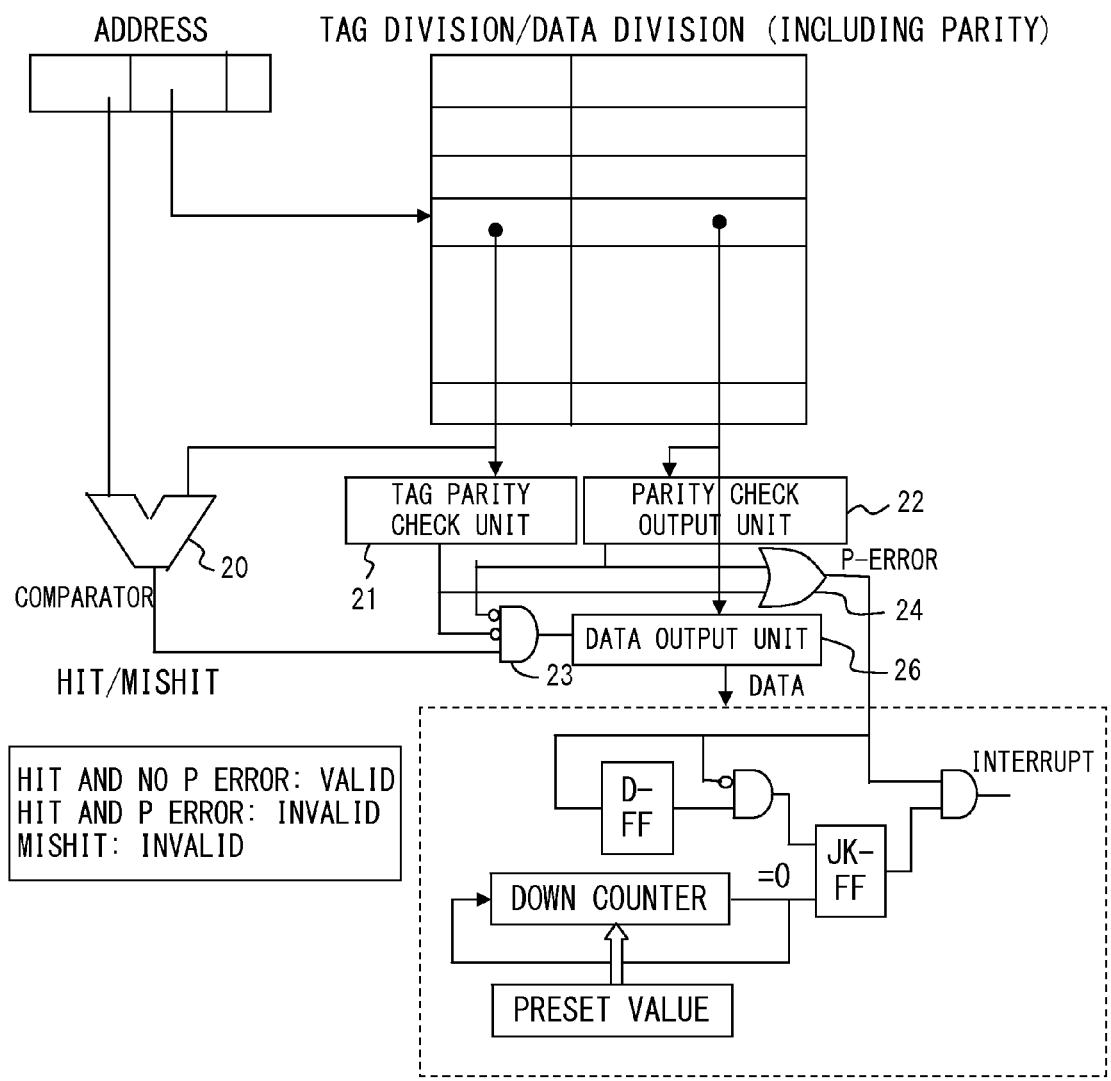
FIG. 4A is a view of the cache memory system according to the present embodiment.

FIG. 4A (in FIG. 4A, the same component illustrated in FIG. 3A is assigned the same reference numeral, and the detailed description is omitted here) is an example in which the system of determining whether an error is a hardware error or a soft error, which is the purpose of the SE bit illustrated in FIG. 3A, is realized in another system. The JK-FF is set to "1" when a parity error once occurs. When the value is set to 0, a down counter activates the signal (=0) for resetting the JK-FF, and simultaneously sets a preset value for the value of itself. If a parity error occurs with the JK-FF set to "1", both of the output of the JK-FF and the p-error signal are set to "1", and the logical product circuit obtains a logical product of the values, thereby activating the interrupt signal. That is, the interrupt signal operates to determine a hardware error if a parity error occurs twice in a period in which the down counter generates "=0" (also based on that it is determined that it is rare that soft errors frequently occur and the probability of continuous occurrences of soft errors is very low). The time taken for the down counter to indicate 0 is about 1/10 of the time interval of the occurrence of a soft error. For example, when a soft error occurs once a year, the above-mentioned time interval is set as about one month. Thus, when a parity error occurs twice or more in a month, it is determined that the error is a hardware error.

FIG. 4B is a timing chart of the portion enclosed by the broken lines in FIG. 4A. When a parity error (p-error) occurs in the data division of the tag division of the cache memory with the JK-FF set to "1", the contents of the JK-FF is set to "1" at the falling edge of the p-error. The down counter is set to 0, and simultaneously returns to the preset value. When the value of the down counter is 0 (=0 indicates a high level), the JK-FF indicates "0". If a parity error occurs again with the JK-FF set to "1", that is, another parity error occurs after a parity error once occurs, then the logical product with the output of the JK-FF activates the interrupt signal.

When it is determined that a soft error has occurred by using the interrupt signal in determining whether an error is a soft error or a hardware error, that is, when there is no interrupt signal, data is read from the main memory to write the data to the cache memory. If the interrupt signal is activated, and it is determined that a hardware error has occurred, an event that an interrupt is generated in the CPU can be generated, and the process can be committed to the program of the CPU. It is obvious that data in the main memory can be read and the execution of the process can be continued although it is determined that a hardware error has occurred.

In the example illustrated in FIG. 3A, the cache memory is operated in the direct map system. However, it can be applied to a set associative system.

FIG. 5 is a configuration when a 2-way associative system is used. In this figure, a status bit of a tag is omitted.

The cache memory 11a is configured by two ways. Thus, two comparators 20-1 and 20-2 are provided for comparing the higher order of the CPU address with the tag division, and generating a hit signal. The comparators 20-1 and 20-2 generates a signal indicating whether or not there is data specified by the CPU address in the cache memory 11a. This signal, the parity check results from tag parity check units 21-1 and 21-2 for detecting an error in the tag division of each way, and signals obtained by logically inverting the parity check results of the parity check output units 22-1 and 22-2 for detecting an error in the data division are input to the logical product circuits 30-1 and 30-2. The logical sum of the outputs of the logical product circuits 30-1 and 30-2 is obtained by a logical sum circuit 31, and output as a cache hit signal. Therefore, in a way including the data corresponding to the CPU address, a cache hit signal is generated when no error is detected in the tag division or the data division. This indicates that the CPU is allowed to access the cache memory 11a by defining a cache hit not only when a corresponding entry is stored in the cache memory 11a but also when no error occurs. Therefore, not only when no corresponding entry is stored in the cache memory 11a but also when an error occurs, the operation is performed as when a cache mishit occurs.

The outputs of the logical product circuits 30-1 and 30-2 are also input to a way selection unit 32 to select the way in which "1" is output. Also in this case, a way in which not only the corresponding entry is stored in the cache memory 11a, but also no error exists is selected.

In addition, the check results from the tag parity check units 21-1 and 21-2 and the signals obtained by inverting the logics of the check results from the parity check output units 22-1 and 22-2 are input to logical product circuits 33-1 and 33-2 for each way to obtain a logical product. The signals obtained by inverting the logics of the outputs of the logical product circuits 33-1 and 33-2 are respectively input to logical product circuits 34-1 and 34-2. The SE bits of the respective ways are input to the logical product circuits 34-1 and 34-2, and a logical product is obtained for each way. The outputs of the logical product circuits 34-1 and 34-2 are input to a logical sum circuit 35, a logical sum is obtained, and a result is output as an interrupt signal in the CPU. The interrupt signal is generated as a result of an occurrence of a hardware error when an error is detected in one or both of the tag division and the data division in one or more of the ways, and when there is an entry in which the SE bit is "1".

A circuit can be configured as described above for the cache memory in the N way set associative system. That is, a comparator for comparing the higher order of the CPU address with a tag division is provided for each way to obtain a logical product of the output of the comparator and a logical inverse signal of the parity check results of the tag division and the data division of the way, and the result is defined as a way selection signal. In addition, the logical sum of the way selection signal is defined as a cache hit signal. In one or more of the ways, when there is an error in one or both of the tag division and the data division and the SE bit indicates "1", an interrupt signal to the CPU is generated.

FIG. 6 illustrates a circuit for performing a parity check. FIG. 7 is a view of the ECC circuit as a error detection circuit.

The circuit for a parity check illustrated in FIG. 6 is applicable for a tag parity check unit and a parity check output unit.

In FIG. 6, a byte parity is adopted for cache memory. A byte parity is a configuration of 8 parity bits by assuming that one parity bit is provided for one byte, that is, one word is configured by 8 bytes. With the configuration, a parity check is performed for 1 byte. A plurality of parity checks are performed in parallel in a circuit, and a logical sum of all parity check results is used as a parity check result of entire data. The data of 64 bits configured by 8 bytes is used by reading data excluding the parity bits.

With the condition illustrated in FIG. 6, the eight parity bits are replaced with a redundant ECC bit to enhance the quality. FIG. 7 is the configuration when 8 ECC redundant bits are used. By reading 8 ECC redundant bits, one bit error is corrected and output. An error signal is output for uncorrectable error for two or more bit errors. However, in this system, excess time is required in checking and correcting an ECC. When a soft error rate is high, the quality is considered, and a system for higher reliability using an ECC as illustrated in FIG. 7 can be adopted although the performance in processing speed is low.

FIG. 8A is a configuration with an additional ECC circuit illustrated in FIG. 7 as applied to FIG. 3A. In FIG. 8A, the same component also used in FIG. 3A is assigned the same reference numeral, and the detailed explanation is omitted here.

A ECC/parity selection unit 40 can set whether the error detecting system is operated using an ECC or a parity. In FIG. 8A, the write unit to the cache memory is omitted. However, if an ECC system is selected by the ECC/parity selection unit 40, data corresponding to the 64-bit data input from the CPU is generated by an ECC bit generation circuit (not illustrated in the attached drawings) and written to the ECC bit illustrated in FIG. 7. If a parity system is selected by the ECC/parity selection unit 40, parity data corresponding to each byte of the 64-bit data input from the CPU is generated by the parity bit generation circuit (not illustrated in the attached drawings) and written to the p (parity) bit illustrated in FIG. 6. When the ECC system is selected, the ECC/parity selection unit 40 inputs the uncorrectable error signal of the ECC circuit 41 illustrated in FIG. 7 to a logical sum circuit 45. When the parity system is selected, the parity error signal of the parity check output unit 22 whose configuration is illustrated in FIG. 6 is input to the logical sum circuit 45. The logical product of the output of the logical sum circuit 45 and the SE bit of the cache memory is obtained by the unit 46 as an interrupt signal to the CPU.

In FIG. 8A, the data of the data division of the cache memory 11 is input to the parity check output unit 22 and the ECC circuit 41. The data from the data division and the data whose error has been corrected by the ECC circuit 41 are input to a multiplexer 42. The multiplexer 42 outputs any data to the data output unit 26 according to the setting of the ECC/parity selection unit 40. The parity check result of the parity check output unit 22 and the setting signal of the ECC/parity selection unit 40 are input to a logical product circuit 43. The uncorrectable error signal of the ECC circuit 41 and the logic inversion signal of the setting signal of the ECC/parity selection unit 40 are input to a logical product circuit 44. The signals whose logics are inverted to each other in the setting signals of the ECC/parity selection unit 40 are input to the logical product circuits 43 and 44, thereby selecting the output of one logical product circuit. The outputs of the logical product circuits 43 and 44 are input to the logical sum circuit 45. That is, when the output from the ECC/parity selection unit 40 is "0", "1" is input as the logical inversion of "0" to the input terminal of the logical product circuit 44 when the output from the ECC/parity selection unit 40 is "0", thereby selecting the logical product circuit 44. On the other hand, when the output from the ECC/parity selection unit 40 is "1", "1" is input to the input terminal of the logical product circuit 43, thereby selecting the logical product circuit 43. The output of the tag parity check unit 21 is also input to the logical sum circuit 45, a logical sum is obtained, and a result is output as an interrupt signal to the CPU. Thus, if an error in the data division is detected in the parity check, an uncorrectable error is detected in the ECC check, or a parity error is detected in the tag, the error signal is low although the information about the tag division matches the address from the CPU, and the logical product is obtained by the unit 47. Therefore, no hit is acquired and the cache controller performs a process as a mishit. The logical product of the error output from the unit 45 and the SE bit of the cache memory, the same as described with reference to the embodiment in FIG. 3A, is obtained by the unit 46, and if the SE bit is 1, the output is also 1. Therefore, the interrupt signal to the CPU is valid, thereby performing the process as a hardware error. In the ECC processing, consider that the circuit delay is conspicuous. Depending on the prediction result of a soft error rate, a system of lower performance in operation speed but higher reliability (ECC processing) is to be selected. That is, when a prediction result of a soft error rate is higher than the prediction of a manufacturer, the multiplexer 42 is switched so that the corrected data from the ECC circuit can be selected. When the prediction result of a soft error rate is within the scope of the prediction of the manufacturer, the data is output as is, and the parity check result is to be output.

Figure 9:
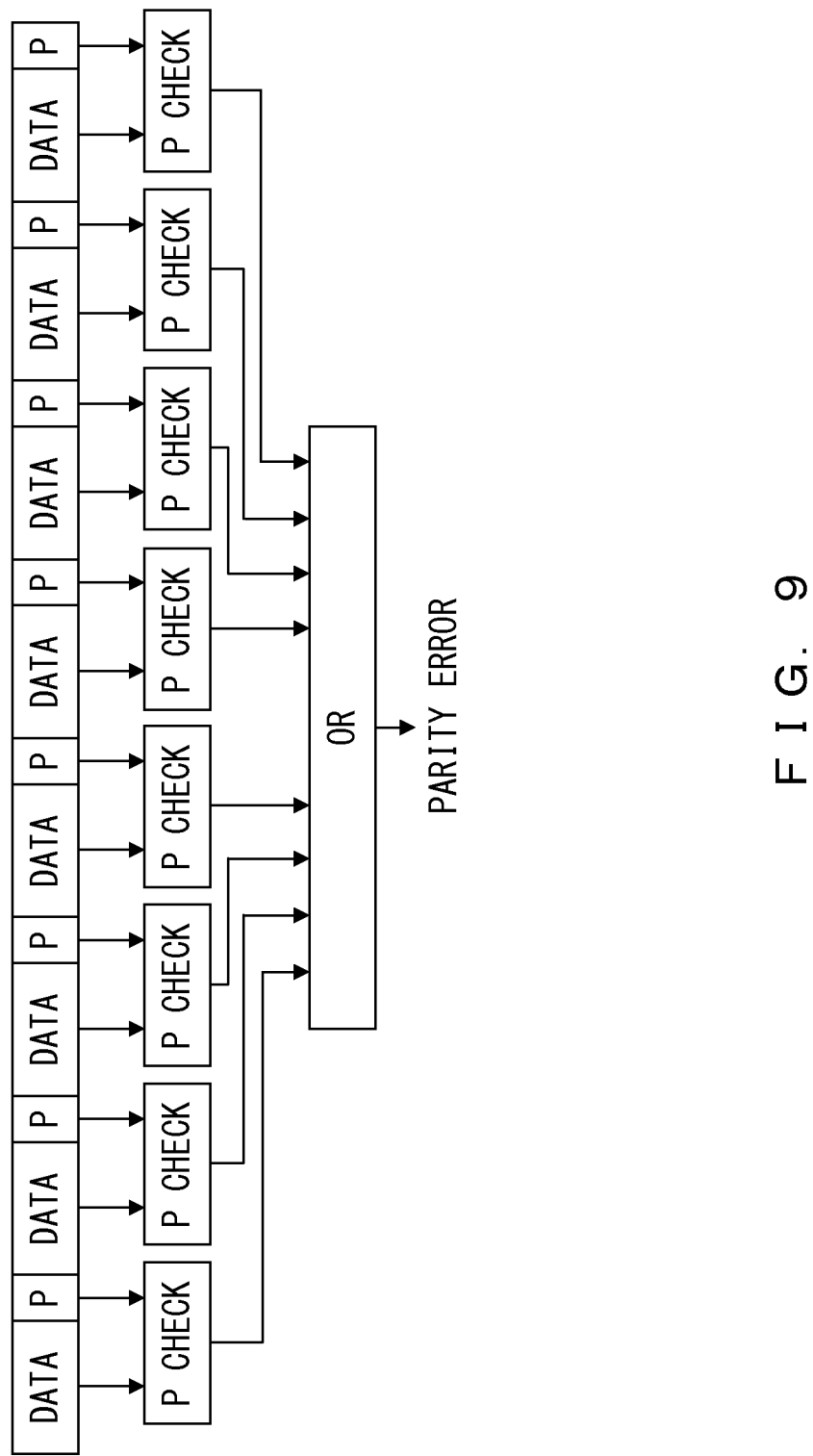
FIG. 9 illustrates a circuit for performing a parity check.
Figure 10:
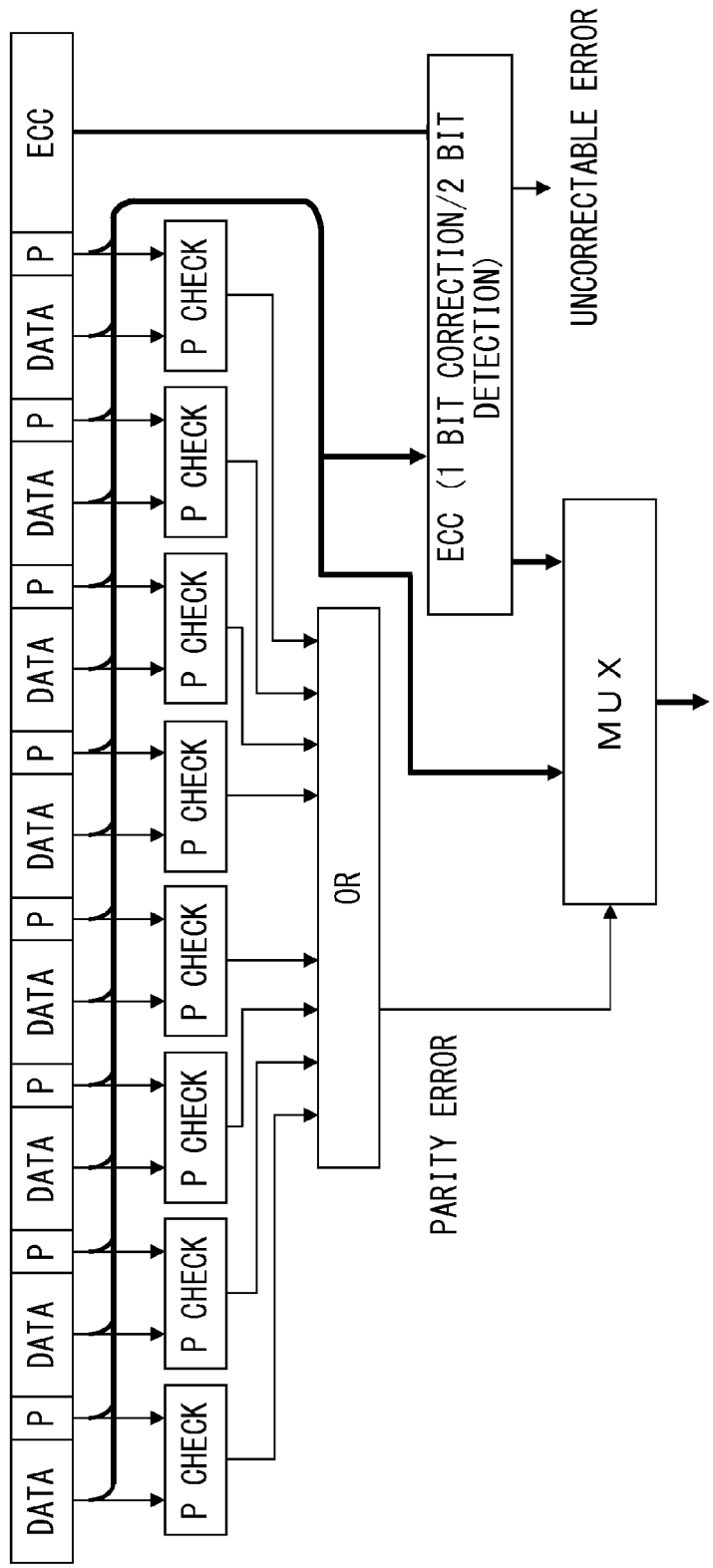
FIG. 10 is an explanatory view of a configuration for an error check applicable in performing both parity check and ECC correction.

FIGS. 9 and 10 are explanatory views of the configuration for an error check applicable to a parity check and an ECC.

FIG. 9 is a configuration of 1-bit parity added for each byte to 64-bit data, and is a configuration only for a parity check.

Figure 8B:
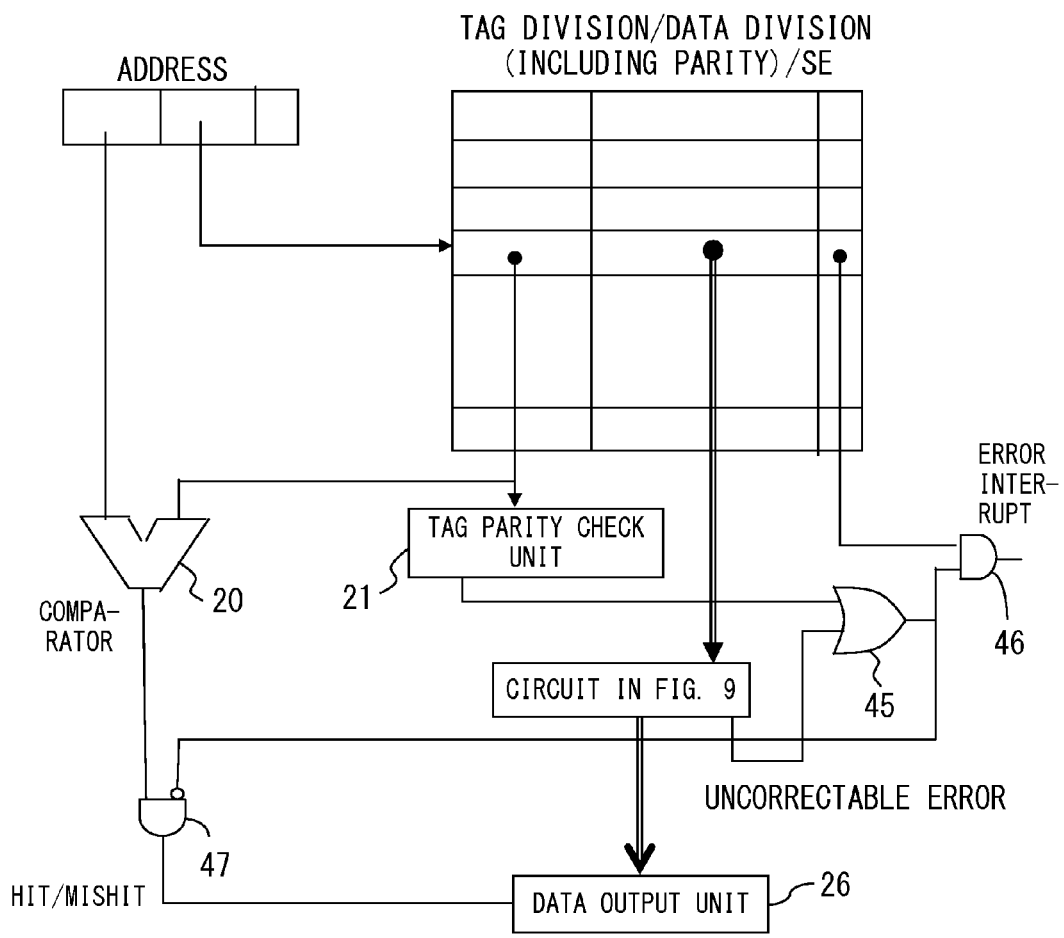
FIG. 8B is a configuration in which the circuit illustrated in FIG. 9 is used.

In FIG. 10, an ECC bit is added to the configuration in FIG. 9. In the ECC, the most common SECDED system (1-bit error correction/2-bit error detection) is assumed. Using the added ECC bit, an error correction can be performed, and a parity check and an ECC can be simultaneously performed. FIG. 8B is an embodiment using the circuit. In this embodiment, in a state in which a normal parity error does not occur, a multiplexer MPX outputs the data from the cache as is. If a parity error occurs, the multiplexer MPX selects the output from an ECC circuit. When a 2-bit error, that is, an uncorrectable error, occurs, it is defined as a cache mishit, and the process performed on the above-mentioned embodiment of the present invention is performed. In this circuit, in a normal state including no parity error, a higher speed process only with a parity check is performed. When a parity error occurs, an ECC of high reliability is effective, thereby realizing a high-speed and high reliable system.

FIGS. 11 through 13 are explanatory views of the detailed operation according to another embodiment of the present invention.

In the present embodiment, the cache memory configuration is designed for 2 ways. In FIG. 11, the same component also illustrated in FIG. 5 is assigned the same reference numeral.

In the embodiment illustrated in FIG. 11, a mode in which a high reliable operation is performed or a normal operation mode can be set. The setting of a mode is made for the way selection unit 32. A mode setting value is written in a register 52, and is input to the way selection unit 32. The CPU outputs to an address decoder 50 the write address of the mode setting value to the register 52. The address decoder 50 decodes the address, and inputs it to a logical product circuit 51. The address refers to the address of the register 52, and is a write enable signal to the register 52 by being decoded. A write signal from the CPU is also input to the logical product circuit 51. An enable signal and a write signal are input to the logical product circuit 51, and a logical product is obtained and output. The output of the logical product circuit 51 is input to the register 52, and the data from the CPU (mode setting value) is latched in the register 52.

In the normal operation mode (mode 0), a part of the address from the CPU reads the tag divisions of both ways, and the data read from the tag divisions is compared with the higher order portion of the address from the CPU. If the values match in any tag division, it refers to a cache hit, and the data division in the way in which the hit is detected is read to the CPU through the way selection unit 32. In the normal operation mode, different contents are stored in ways 0 and 1, and are used for a higher hit rate in the cache. Also in the normal operation mode, the parity check system illustrated in FIG. 4A is used, and when a parity error occurs, it can be processed as a mishit. In the high reliable mode (mode 1) in the present embodiment, the same contents are stored in two ways for enhanced quality. When there is no error, the data in both ways are read. Although a parity error occurs in one way, the CPU can read the data in another way in which no parity error occurs, thereby enhancing the quality by avoiding the parity error. Thus, when the same contents are stored in two ways, the number of ways in the cache memory is to be a multiple of 2. In this method, two ways can store the data of the same contents as a pair. The number of ways for storing the same contents is not limited to two, but can be any number M. However, the total number of ways of the cache memory is a multiple of M.

The operation according to the present embodiment is described below with reference to FIG. 12. FIG. 12 is a table of the relationship between the mode of the operation of reading data from the cache memory and the signal value. The operation in the table illustrated in FIG. 12 is performed by the way selection unit 32.

The operations 1 through 6 refer to normal 2-way set associative operations. The operation 1 refers to a mishit in both ways, and no data can be read from the cache. The operation 1 refers to a normal read from the way 0 (without a parity error). The operation 3 refers to a hit in the way 0, but the data from the cache cannot be transferred to the CPU because a parity error has occurred. The operation 4 refers to a hit in the way 1, and data is normally read (without a parity error). The operation 5 refers to a hit in the way 1, but data from the cache cannot be transferred to the CPU because a parity error has occurred. The operation 6 refers to a hit in both ways, but it is processed as an error because it is an abnormal operation which never occurs in the normal operation.

The operations 7 through 10 are operations according to the present embodiment, and the same contents are read is there is no error in the tag division and the data division in the cache memory. The operation 7 is an operation in the mode according to the present embodiment. Since there is a hit in the way 0 without a parity error, the data in the way 0 is transferred to the CPU. Since the operation 8 refers to a hit in both ways, but a parity error occurs in the way 0 and no parity error is detected in the way 1, the data in the way 1 is transferred to the CPU. Since the operation 9 refers to a hit only in the way 1 without a parity error, the data in the way 1 is transferred to the CPU. The operation 10 refers to a hit in both ways, but a parity error has occurred in the data of both ways. Therefore, the contents of the cache is not transferred to the CPU.

The operation of writing data to the cache according to the present embodiment is described below with reference to the table in FIG. 13.

In the normal operation mode (mode 0) a 2-way associative cache is operated. The operations 1 through 7 are normal operations. The operation 1 refers to a hit in the way 0, and the data from the CPU is written to the way 0. The operation 2 refers to a hit in the way 1 and the data from the CPU is written to the way 1. The operation 3 refers to a mishit in both ways. However, since the contents in the way 0 are invalid, the data from the CPU is written to the way 0. The operation 4 refers to a mishit in both ways. However, since the contents in the way 1 are invalid, the data from the CPU is written to the way 1. The operation 5 refers to a mishit in both ways, and the contents of both ways are valid. Therefore, it is necessary to save the data in one of the way in main memory, and the data is to be written to the corresponding position. A method of determining which way is to be saved is a well known LRU (least recently used) system, which is easily implemented in the 2 way system. That is, one bit in the tag division is assigned as an LRU bit, and when the access from the CPU refers to a hit, the LRU bit is set to 1 if the hit is detected in the way 0, and the LRU bit is set to 0 if the hit is detected in the way 1. Thus, the information not in the last hit way is written. By adopting the system, data is written to the way 0 because the LRU is 0 in the operation 5. However, in the operation 6, the LRU is 1, and data is written to the way 1. Since the operation 7 refer to a mishit and invalid data in both ways, data is written to the way 0.

The operations 8 through 10 are the (high reliable) modes according to the present embodiment, and data is written to both ways during a writing operation in the mode 1, that is, the contents in both ways are the same. However, in the operation 9, since both ways are valid, the contents of the cache are saved in the main memory, and then data is written to both ways.

Thus, the above-mentioned embodiments can provide a cache memory system capable of enhancing the operation quality of the cache memory as a countermeasure against a soft error by an α ray and a cosmic ray (neutron beam).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A cache memory system, comprising:
a cache memory to store data containing a tag division and a data division;
an error detection unit to detect an error in the tag division and the data division; and
a control unit to control the cache memory in a write through manner by defining a signal of a result of a logical product of a signal indicating that there is a cache hit in cache hit information in the tag division and a signal indicating that there is no error detected in an error detecting process by the error detection unit as cache hit information to be transmitted to a CPU,
wherein data of an address corresponding to data in the cache memory in which an error has occurred is read from the main memory when the error has occurred as in a case in which there is a cache mishit, and the data in the cache memory which has caused the error is replaced with the read data.

2. The system according to claim 1, wherein;
the cache memory includes a soft error bit which is set to "1" when an error occurs in each piece of data; and
the control unit generates an interrupt signal to a CPU when an error is detected in the error detection unit for the data in which the soft error bit is set to "1".

3. The system according to claim 1,
further comprising a register to be set if an error has occurred before, and be reset periodically,
wherein when the register is set, and an error is detected by the error detection unit, the control unit generates an interrupt signal to a CPU.

4. The system according to claim 1, wherein the error detection unit comprises a parity check circuit.

5. The system according to claim 1, wherein the error detection unit comprises a parity check circuit and an ECC circuit, and switches between the circuits.

6. The system according to claim 1, wherein the error detection unit comprises an ECC circuit for 1-bit error correction and 2-bit error detection, and determines that an error has occurred when a detectable 2-bit error has been detected.

7. The system according to claim 1, wherein when an error occurs in the cache memory during a writing operation, a status of the tag division is placed in an invalid state.

8. The system according to claim 1, wherein the error detection unit comprises a parity check circuit and an ECC circuit, and simultaneously operates the both circuits.

9. The system according to claim 1, wherein:
the cache memory adopts a 2N way set associative system; and
the control unit performs control of writing same data to a pair of ways and performing reading data simultaneously in 2 ways, and if an error occurs in one way, placing another way in a valid status for read access.

10. A semiconductor device comprising the system according to claim 1.

11. A method of controlling a cache memory system having cache memory storing data containing a tag division and a data division, comprising:
detecting an error in the tag division and the data division;
controlling the cache memory in a write through manner by defining a signal of a result of a logical product of a signal indicating that there is a cache hit in cache hit information in the tag division and a signal indicating that there is no error detected in an error detecting process as cache hit information to be transmitted to a CPU; and
reading data of an address corresponding to data in the cache memory in which an error has occurred from the main memory when the error has occurred as in a case in which there is a cache mishit, and replacing the data in the cache memory which has caused the error with the read data.

* * * * *